(12) United States Patent  
Kettler

(10) Patent No.: US 8,389,127 B2  
(45) Date of Patent: Mar. 5, 2013

(54) HOT FORMED PART, AND METHOD OF MAKING A HOT FORMED PART

(75) Inventor: Markus Kettler, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 179 days.

(21) Appl. No.: 12/606,383

(22) Filed: Oct. 27, 2009

(65) Prior Publication Data

US 2010/0112371 A1    May 6, 2010

(30) Foreign Application Priority Data

Oct. 30, 2008  (DE) .......................... 10 2008 053 878

(51) Int. Cl.
- *B21D 19/10* (2006.01)
- *C21D 1/19* (2006.01)

(52) U.S. Cl. ........... 428/597; 148/559; 148/663; 72/364

(58) Field of Classification Search .................... 428/597
See application file for complete search history.

(56) References Cited

U.S. PATENT DOCUMENTS

| | | | | |
|---|---|---|---|---|
| 2,430,518 A * | 11/1947 | Mainwal | ....................... | 428/132 |
| 2,764,446 A * | 9/1956 | Churnside et al. | .......... | 293/111.1 |
| 3,008,551 A * | 11/1961 | Cole | .............................. | 428/132 |
| 3,411,194 A * | 11/1968 | Don | ............................... | 407/29.1 |
| 3,901,611 A * | 8/1975 | Simonsen | ..................... | 403/187 |
| 4,251,970 A * | 2/1981 | Home | ............................ | 52/674 |
| 4,426,824 A * | 1/1984 | Swensen | ..................... | 52/791.1 |
| 6,481,175 B2 * | 11/2002 | Potter et al. | ..................... | 52/634 |
| 7,842,396 B2 * | 11/2010 | White | .............................. | 428/597 |
| 2004/0226634 A1 * | 11/2004 | Hirasawa et al. | ............. | 148/609 |
| 2007/0231593 A1 * | 10/2007 | Ryu et al. | ...................... | 428/596 |

FOREIGN PATENT DOCUMENTS

WO    WO 9907492 A  *  2/1999

* cited by examiner

*Primary Examiner* — Jennifer McNeil  
*Assistant Examiner* — Adam Krupicka  
(74) *Attorney, Agent, or Firm* — Henry M Feiereisen LLC

(57) ABSTRACT

A hot formed part of high-strength steel includes a body having an opening and formed in one piece with at least one tab in the form of a tongue projecting into the opening for holding a connection piece captive on the body. The tab thus is formed in one piece with the hot formed part and is produced jointly with the openings during manufacture of the hot formed part in the hot forming process.

4 Claims, 2 Drawing Sheets

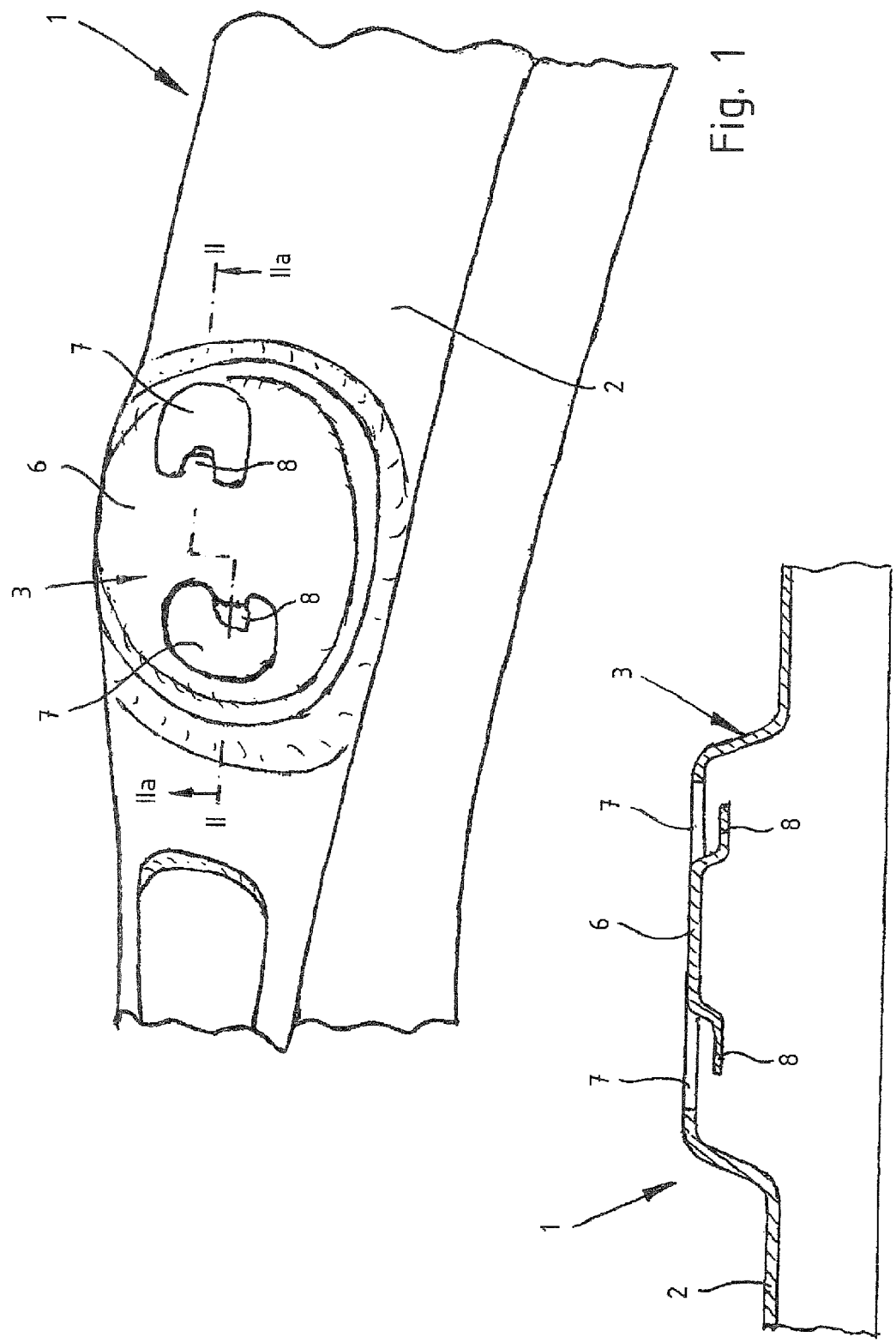

HOT FORMED PART, AND METHOD OF MAKING A HOT FORMED PART

CROSS-REFERENCES TO RELATED APPLICATIONS

This application claims the priority of German Patent Application, Serial No. 10 2008 053 878.7, filed Oct. 30, 2008, pursuant to 35 U.S.C. 119(a)-(d), the content of which is incorporated herein by reference in its entirety as if fully set forth herein.

BACKGROUND OF THE INVENTION

The present invention relates, in general, to a hot formed part, and to a method of making a hot formed part.

The following discussion of related art is provided to assist the reader in understanding the advantages of the invention, and is not to be construed as an admission that this related art is prior art to this invention.

The automobile industry requires a number of manufacturing stages to build a vehicle body, whereby in certain situations hot formed parts of steel with high material strength have to be coupled with connection pieces for a time period during which the connection pieces should be held temporarily captive on the hot formed part while the hot formed part is handled during production of the vehicle body. The temporary fixation of the connection pieces may, for example, be realized with the assistance of clamps or clips. Another example involves the use of flexible tabs. As the hot formed parts have a high material strength, the tabs are, however, difficult to bend so that proposals have been advanced to provide the tabs on a separate cold formed part which is then connected to the hot formed part by spot welding. The temporary fixation of the connection pieces on the hot formed parts is then realized by bending the tabs in a way to conform to the configuration of the connection pieces.

The need to produce added cold formed parts in the manufacturing process of a vehicle body is not only time-consuming but also incurs added costs as a result of parts and tool expenses and manufacturing costs. The overall manufacturing process thus becomes more complicated.

It would therefore be desirable and advantageous to address prior art shortcomings and to provide a cost-efficient manufacturing process of a vehicle body.

SUMMARY OF THE INVENTION

According to one aspect of the present invention, a hot formed part of high-strength steel includes a body having an opening and formed in one piece with at least one tab in the form of a tongue projecting into the opening for holding a connection piece captive on the body.

The present invention resolves prior art problems by making the tab for temporarily fixing a connection piece in one piece with the hot formed part. The tab can have a tongue-like configuration and can be arranged in an opening of the hot formed part. Although the presence of a single tab may be sufficient to hold the connection piece captive, it is, of course, also feasible to provide two or more tabs on the respective hot formed part in order to securely captivate a connection piece during handling of the hot formed part in the manufacturing process. The tabs may be arranged jointly in an opening of the hot formed part or in separate openings.

As a result of the present invention, the need for a separate cold formed part to be provided with a tab is eliminated so that parts and tool costs as well as manufacturing costs are significantly reduced.

A hot formed part according to the present invention may be used, for example, as B pillar of a vehicle body. Such a B pillar typically is connected during the course of the manufacturing process of the vehicle body with a connection piece for hinge reinforcement configured as a heavy forged structure. For manufacturing reasons, the connection piece has to be held loosely but captivated on the hot formed part beforehand. The connection piece can now be held captive in accordance with the present invention by at least one tab on the hot formed part in such a way that a spatial displacement of the hot formed part during the manufacturing process does not result in a loss of the connection piece. The connection piece is retained in its position and can be fixed in the intended way once the hot formed part assumes its final disposition in the vehicle body.

According to another aspect of the present invention, a method of making a hot formed part includes the steps of hot forming a blank of high-strength steel into a shape of a hot formed part with an opening and with at least one tab in the form of a tongue projecting into the opening. The tab or tabs can be configured in such a way that no bending thereof is necessary in order for the connection piece to be attached. The connection piece can be merely suspended from the tab or tabs. There may also be the possibility to so pre-shape the tab as to allow easy bending thereof after the connection piece has been attached for temporary fixation of the connection piece.

According to another advantageous feature of the present invention, the tab may be pushed out or bent out from the plane of the opening in a processing step separate from the hot forming step, i.e. not during the hot forming process. Bending the tab out of the opening may also be carried out, when the hot formed part has cooled down, or even when the hot formed part underwent already hardening, is lasered or sand-blasted/surface-treated. A limited shaping is also possible in a relatively simple manner when hardened parts are involved. It is, of course, also conceivable to only partially harden or subject the hot formed part to a quenching and tempering procedure, whereby the area of the tab is hereby left out so that a subsequent cold deformation is not complicated.

The manufacturing process of the hot formed part with at least one tab is thus so suited that as a result of at least one opening the provision of a free cut can be tailored in the hot formed part with a geometry which allows easy arrangement of the tab and bending thereof for securing a connection piece. Thus, a method according to the present invention enables a significant cost reduction without need for provision of an added component which would require a connection, e.g. through spot welding, to the hot formed part.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a schematic top and side perspective view of a length portion of a hot formed part according to the present invention for use in a B pillar of a vehicle body;

FIG. 2 is a vertical longitudinal section of the hot formed part, taken along the line II-II in FIG. 1 in a direction of arrows 11a.

DETAILED DESCRIPTION OF PREFERRED EMBODIMENTS

Figure 3:
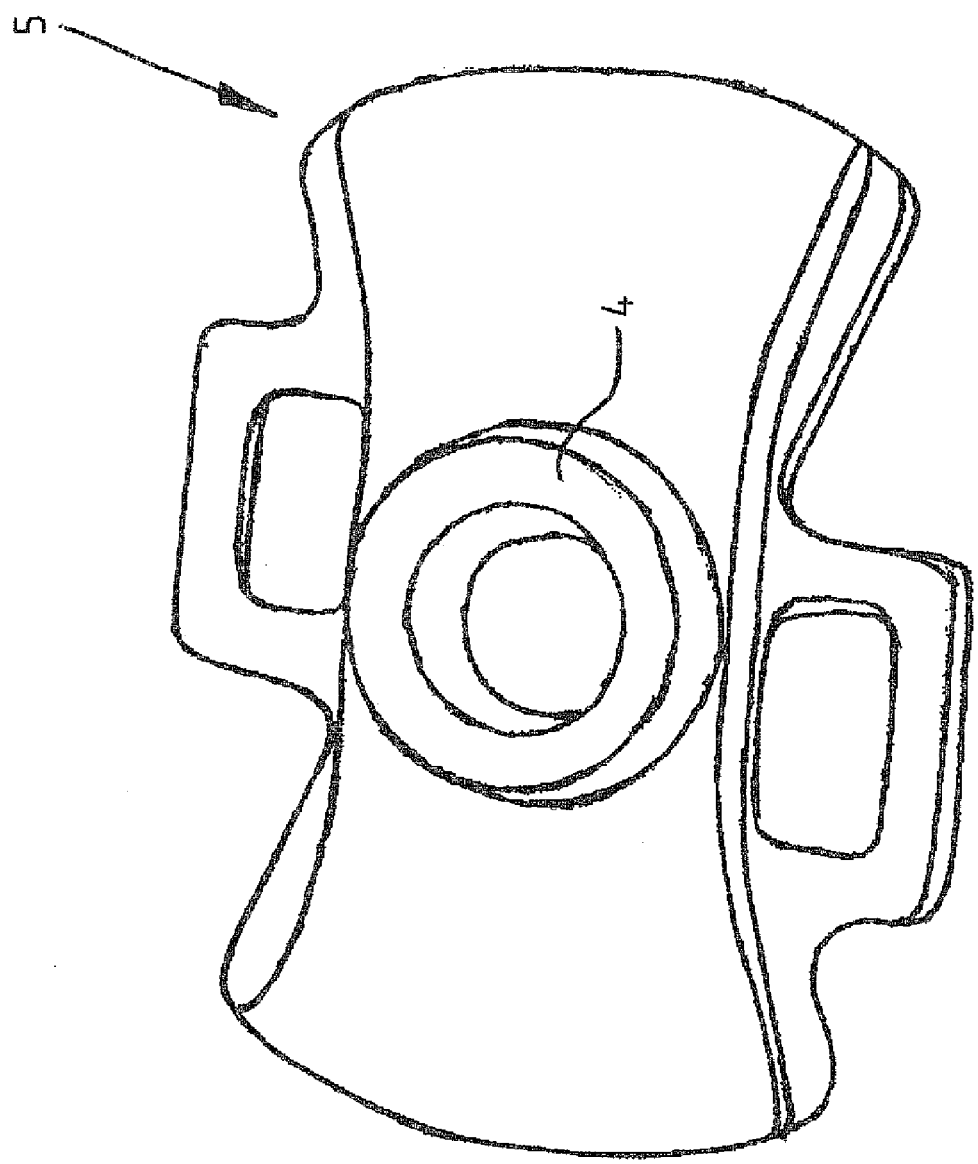
FIG. 3 is a schematic top and side perspective view of a connection piece in the form of a hinge reinforcement.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic top and side perspective view of a length portion of a hot formed part according to the present invention, generally designated by reference numeral 1 and provided, for example, for use as a B pillar of a vehicle body (not shown). The hot formed part 1 has hereby a body of U-shaped cross section. The length portion of the hot formed part has a land area 2 formed with a cup-shaped embossment 3 for receiving, e.g. through snap-fitting, a neck 4 of a connection piece, shown in FIG. 3 and generally designated by reference numeral 5. The connection piece 5 is hereby constructed by way of example as a hinge reinforcement in the form of a heavy forged structure.

In order to be able to hold the connection piece 5 loosely but securely on the hot formed part 1 as the hot formed part 1 is maneuvered and handled during the manufacturing process, the embossment 3 has an end face 6 which is formed with two openings 7 into which two tabs 8 in the form of tongues project which are formed in one piece with the hot formed part 1. The openings 7 and the tabs 8 are produced at the same time directly with the hot forming process of the hot formed part 1. These tabs 8 are provided to allow the connection piece 5 to be held loosely but securely on the hot formed part 1 as long as is necessary during the manufacturing process of the vehicle body. In other words, the hot formed part 1 can be moved in any spatial direction during the manufacturing process without encountering a detachment of the connection piece 5 from the hot formed part 1.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. In combination:
a hot formed part of high-strength steel, said hot-formed part comprising a body having an end face provided with an opening and formed in one piece with at least two tabs extending in opposite directions and each configured in the form of a tongue arranged in the opening and extending in substantial parallel relation to the end face; and
a connection piece held detachably captive on the tabs of the body.

2. A method, comprising:
hot forming a blank of high-strength steel into a shape of a hot formed part with an end face having an opening and with at least two tabs extending in opposite directions and configured in the form of a tongue arranged in the opening and extending in substantial parallel relation to the end face;
partially quenching and tempering the hot formed part such as to leave the tabs in an area which is not subjected to quenching and tempering; and
attaching a connection piece to the tabs to detachably hold the connection piece captive.

3. The method of claim 2, wherein the tabs are bent out of the opening during the hot forming step.

4. The method of claim 2, further comprising shaping the tabs in a processing step separate from the hot forming step and bending the tabs out of the opening.

* * * * *